United States Patent Office 3,240,733
Patented Mar. 15, 1966

3,240,733
PROCESSES FOR THE RECOVERY OF POLYCARBONATES FROM STABLE EMULSIONS
Ann V. Pinter, Morristown, N.J., assignor to Allied Chemical Corporation, New York, N.Y., a corporation of New York
No Drawing. Filed Aug. 31, 1961, Ser. No. 135,136
7 Claims. (Cl. 260—18)

This invention relates to the recovery and purification of a polycarbonate from stable, aqueous emulsions of a solution of the polycarbonate in an organic solvent and an aqueous solution of inorganic salt. More particularly it is directed to breaking those stable emulsions and precipitating the polycarbonate by addition of a water miscible, lower aliphatic alcohol.

It is known to produce polycarbonates of bisphenols by phosgenating with gaseous phosgene an intimate mixture or emulsion of an aqueous solution of a caustic alkali and a bisphenol, alone or together with an organic dihydroxy compound other than a bisphenol, and an organic solvent, such as a saturated, aliphatic chloride, for the phosgene gas and for the polycarbonate which is produced. When the resulting emulsion of aqueous and organic solvent phases does not spontaneously separate into two liquid layers on standing, the emulsion is commonly mixed with water, an inorganic or organic acid, such as hydrochloric or acetic aid, or an organic liquid diluent, such as acetone or additional amounts of the organic solvent, to break the emulsion so that it separates into a solution of the polycarbonate in the organic solvent and an aqueous solution containing inorganic chloride and carbonate salts formed by the reaction of the phosgene, and any unreacted phenate. The organic solvent phase containing the dissolved polycarbonate then can be layer separated from the aqueous phase and the polycarbonate recovered and purified by conventional procedures.

Furthermore, it has been found that a polycarbonate product can be prepared by phosgenating an intimate mixture of aqueous caustic alkali solution and a solution in an organic solvent for the phosgene of a material formed by heating a bisphenol with a drying oil. The resulting solution of polycarbonate in the organic solvent forms an emulsion with the aqueous phase present containing inorganic salts. These methods for preparing polycarbonates and the products thus produced are described and claimed in United States patent application Serial No. 109,489, filed May 12, 1961, of Rudolph D. Deanin and Ann V. Pinter, now United States Patent 3,157,606, and constitute reacting an ester forming derivative of carbonic acid such as phosgene or a carbonic acid diester with the reaction product obtained by heating a mixture of a fatty oil such as a drying, semi-drying or non-drying oil, and a bisphenol of the structure

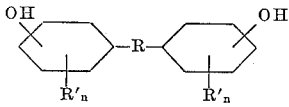

wherein R is a divalent alkane or saturated alicyclic radical or a divalent aryl or aralkyl radical containing only aromatic unsaturation, R' is a monovalent alkane radical and $n$ is an integer from 0 to 4, and the derivatives of those bisphenols which contain halogen attached to carbon in an aromatic ring.

In preparing some polycarbonates by the foregoing procedures, especially in preparing the polycarbonates of bisphenols with other dihydroxy compounds or of the products produced by heating a drying oil and a bisphenol, I have found the product can be an unexpectedly stable emulsion of aqueous and organic solvent phases. These stable emulsions are not broken by additon of water, the organic solvent for the polycarbonate which is present, hydrochloric acid or acetone. Nor are they broken by addition of numerous other agents heretofore used to break aqueous emulsions formed by phosgenating dispersions of an aqueous caustic alkali-bisphenate solution and the organic solvent for the phosgene and polycarbonate.

I have discovered, however, that addition of a water miscible, aliphatic alcohol to form an aqueous alcoholic solution of the organic solvent will serve to break those stable emulsions and to precipitate the polycarbonate which then can be separated from the liquid phase which is present. Further, I have found two procedures are particularly effective to recover a highly purified polycarbonate from that precipitate.

In operating in accordance with the processes of my invention, a stable emulsion of an aqueous, inorganic salt solution and a polycarbonate solution in an organic solvent in which water soluble, aliphatic alcohols are also soluble, especially a stable emulsion of an aqueous, inorganic salt solution and a solution in the organic solvent of a polycarbonate of a bisphenol with an organic dihydroxy compound other than a bisphenol or a polycarbonate produced by heating a mixture of a bisphenol and a drying oil and phosgenating the resulting product in the presence of aqueous caustic alkali, is mixed with at least one of the water miscible, aliphatic alcohols soluble in the organic solvent, preferably with methyl, ethyl or a propyl alcohol, in an amount sufficient to break the emulsion and to precipitate the polycarbonate. The thus precipitated polycarbonate is separated from the liquid in contact therewith.

My invention further comprises treating the thus recovered polycarbonate by either of two purification procedures to obtain a highly purified polycarbonate product.

In the first of those purification procedures the precipitated polycarbonate is re-dissolved in an organic solvent immiscible with water and in which water soluble, aliphatic alcohols are soluble, which can be the same or different from the organic solvent which was present in the phosgenation of the bisphenate. With or without washing this solution with water, the polycarbonate is re-precipitated by addition of one of the foregoing water miscible alcohols. The re-precipitated polycarbonate thus obtained has a substantially higher purity than the polycarbonate initially precipitated from the stable emulsion. By separating the precipitated polycarbonate from the liquid and repeating this re-solution of polycarbonate precipitate and re-precipitation with alcohol, a final polycarbonate product of any desired high purity with respect to inorganic salts can be obtained.

The second purification procedure which can be employed for treating the initial polycarbonate precipitated from the stable emulsion, involves dissolving the precipitated polycarbonate in an organic solvent and drying the solution by contact with an inorganic salt capable of forming hydrates with water, preferably by contact with anhydrous calcium chloride. By thus removing water from the solution of the polycarbonate in the organic solvent, inorganic salts present in the initial precipitate are made insoluble in the solution of the polycarbonate and are separated therefrom together with the hydrated calcium chloride carrying the water absorbed from the polycarbonate solution. By evaporating the organic solvent a highly pure polycarbonate product is obtained.

The water miscible, aliphatic alcohols which can be used in carrying out our process include not only the lower monohydric, saturated alcohols, methanol, ethanol and the two isopropanols, but also the water miscible, unsaturated alcohols and the polyhydric alcohols, the glycols, which are miscible with water, such as allyl alcohol, ethylene glycol, the propane diols and the butane diols.

In the procedure in which the stable emulsions are broken and the precipitated polycarbonate is separated from the liquid present and is re-dissolved in an organic solvent from which it is re-precipitated, these same aliphatic alcohols can be used for the re-precipitation of the polycarbonate to purify it.

In those processes in which the precipitated polycarbonate is dried by contact with an inorganic salt capable of forming higher hydrates by absorption of water, anhydrous or the lower hydrates of salts such as anhydrous calcium chloride, sodium sulfate, magnesium sulfate or calcium sulfate, the mono- or dihydrates of calcium chloride or plaster of Paris ($CaSO_4 \cdot \frac{1}{2}H_2O$), can be used. The use of the low hydrated salts instead of the anhydrous salts is at a sacrifice in the capacity of the salt with respect to the amount of water it can take up from the polycarbonate solution. For that reason, their use is less desirable than the use of the anhydrous salts.

Our invention will be more particularly illustrated and described in the following examples:

*Example 1.*—A mixture of 40 gms. 2,2-bis(4-hydroxyphenyl) propane (bisphenol-A) and 19 gms. of dehydrated castor oil was heated to 270° C. over a period of 40 minutes, held at 270°–320° C. for 30 minutes and then cooled to 30° C. over a period of 45 minutes. The resulting material was dissolved in 500 cc. methylene chloride and added to a solution of 31.5 gms. of 95% caustic soda in 500 cc. of water in a reaction vessel provided with a stirrer, a reflux condenser and a dip tube. The liquids were stirred with a flow of nitrogen gas passed through the dip tube to remove the air present, and 6.4 cc. of a 10% aqueous solution of benzyltriethyl ammonium chloride were added. The flow of nitrogen gas was then discontinued and 27.5 gms. of gaseous phosgene was bubbled into the stirred mixture at a substantially uniform rate over a one hour period, with the reaction mixture cooled to remove exothermic heat of reaction and maintain it at about 30° C. Following completion of the introduction of phosgene gas, the reaction mixture was stirred for another one hour period during which it was maintained at 30° C. The resulting emulsion of the solution of drying oil modified polycarbonate in methylene chloride and the aqueous solution containing water soluble salts, principally sodium chloride and sodium carbonate, was stable and was not broken by addition of water, methylene chloride, hydrochloric acid or acetone.

On the other hand, when this emulsion was mixed with methanol amounting to about 2 volumes of methanol to every one volume of the emulsion, the emulsion was broken and the polymer precipitated as a coagulate, leaving most of the water, methylene chloride and methanol as a clear liquid above the precipitate. When this precipitated polymer was re-dissolved in methylene chloride and this solution was washed by stirring with water, an aqueous-organic phase emulsion re-formed. Addition of methanol broke this new emulsion and re-precipitated a polymer of increased purity. This breaking of the initial and subsequent emulsions and precipitating the polymer by addition of methanol, re-solution of the polymer, and washing the solution with water, causing re-formation of an emulsion, repeated through 3 to 4 cycles gives a precipitate of the polymer which can be mechanically separated from the liquid by filtration, for example, and dried. The polymer product thus obtained is almost free from all inorganic impurities.

*Example 2.*—Dehydrated castor oil amounting to 22.2 gms. and 37 gms. of bisphenol-A were mixed together, heated to 270° C. over a half hour period, held at 270°–320° C. for ½ hour and then cooled to 30° C. over another ½ hour. The resulting material was dissolved in 500 cc. methylene chloride, mixed with aqueous caustic soda and phosgenated, employing the same amount of caustic soda, water, benzyltriethyl ammonium chloride catalyst, phosgene gas and the same reaction conditions as described for Example 1 above.

The resulting reaction product was a stable emulsion of an aqueous phase and a methylene chloride phase containing in solution the drying oil modified polycarbonate of bisphenol-A.

Addition of 200 cc. of methanol to a 100 cc. portion of the resulting stable emulsion, broke the emulsion with precipitation of the drying oil modified polycarbonate. Re-solution in methylene chloride of the precipitated polymer and, without washing this solution with water, re-precipitating the polymer by addition of about 1 volume of methanol to every one volume of the polymer solution was repeated several times. The following table shows the increase in purity of the polymer with respect to salt impurities in terms of the specific conductance of the solutions of polymer in methylene chloride thus obtained.

| Polymer in solution: | Micro-ohms/per cm. |
|---|---|
| First precipitate from reaction product | 52.5 |
| First re-precipitation | 43.5 |
| Second re-precipitation | 32.2 |
| Third re-precipitation | 29.0 |
| Methylene chloride solvent used | 31.3 |

The first three precipitations of the polymer with the methanol removed salt impurities substantially completely, and the fourth precipitation gave a solution which had a specific conductance even lower than that of the methylene chloride solvent used in preparing the solutions.

*Example 3.*—Another 100 cc. portion of the stable emulsion of drying oil modified polycarbonate of bisphenol-A produced by the procedure of Example 2 was treated as described in that example with 100 cc. methanol to break that emulsion and precipitate the polycarbonate. The precipitate, separated from the liquid phase present, was redissolved in about 100 cc. methylene chloride. This solution was dried by addition of about 20 gms. of anhydrous calcium chloride. The calcium chloride containing the absorbed water as a hydrate was filtered from the dry solution of polymer in methylene chloride. A clear, pure solution of the polymer in the methylene chloride was obtained, separated from the precipitated salt impurities which accompanied the calcium chloride. From this solution the pure drying oil modified polycarbonate can be recovered by evaporation of the methylene chloride solvent.

*Example 4.*—A reaction vessel was charged with 500 cc. methylene chloride and 6.4 cc. of a 10% aqueous solution of benzyltriethyl ammonium chloride. After sweeping out the air in the vessel with nitrogen gas, a solution of 31.5 gms. of 95% caustic soda and 19 gms. each of bisphenol-A and resorcinol in 500 cc. of water was added to the stirred reaction mixture simultaneously with the passage of 27.5 gms. phosgene gas into the reaction mixture over a one hour period. The temperature of the mixture was maintained at 30° C. The reaction mixture was stirred for another hour at 30° C. The resulting product was a stable emulsion, which could not be broken by addition of water, methylene chloride, acetone or hydrochloric acid.

Addition of ethanol or isopropyl alcohol to this stable emulsion breaks the emulsion and precipitates the copolycarbonate of bisphenol-A and resorcinol. The precipitated polycarbonate is separated from the liquid present and can be further purified by re-solution in methylene chloride and re-precipitation as described above in Examples 1 or 2, using ethanol or isopropyl alcohol in place of methyl alcohol, until the copolycarbonate precipitated from the solution by the addition of the alcohol and separated from the liquid present, is of the desired high purity with respect to inorganic salts.

I claim:

1. The process for recovering a polycarbonate from a stable emulsion of aqueous inorganic salt solution and a solution in an organic solvent of a polycarbonate prepared by phosgenating, in the presence of an organic solvent, a mixture of an aqueous caustic alkali solution and the reaction product of a bisphenol and a drying oil, which comprises mixing methanol with said stable emulsion in an amount sufficient to break said emulsion and to precipitate the polycarbonate, and separating the precipitated polycarbonate from the liquid in contact therewith.

2. The process of claim 1 in which the stable emulsion comprises an aqueous, inorganic salt solution and a solution in an organic solvent of a polycarbonate produced by heating a mixture of 2,2-bis(4-hydroxyphenyl)propane and a drying oil and phosgenating the resulting product in the presence of aqueous caustic alkali.

3. The process of claim 1 in which the organic solvent in the stable emulsion is a saturated, aliphatic chloride.

4. The process for separating an organic polycarbonate from a stable emulsion comprising an aqueous inorganic salt solution, and a solution in an organic solvent of a polycarbonate prepared by phosgenating a mixture of aqueous caustic alkali solution and a material formed by heating a bisphenol with a drying oil which comprises adding methanol to said stable emulsion to from an aqueous methanol solution of said solvent, thereby breaking said emulsion and precipitating polycarbonate, and mechanically separating the precipitated polycarbonate from the methanol solution.

5. The process for recovering a polycarbonate from a stable emulsion of aqueous inorganic salt solution and a solution in an inorganic solvent of a polycarbonate prepared by phosgenating in the presence of an organic solvent, a mixture of an aqueous caustic alkali solution and a material formed by heating with a drying oil, a bisphenol of the structure

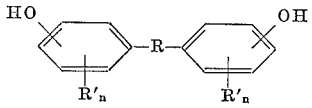

wherein R is a member selected from the group consisting of divalent alkanes, saturated alicyclic radicals, divalent aryl radicals, divalent aralkyl radicals containing only romatic unsaturation, R' is a monovalent alkane radical and $n$ is an integer from 0 to 4 inclusive, and derivatives of the above bisphenols which contain halogen attached to carbon in an aromatic ring, which comprises mixing methanol with said stable emulsion in an amount sufficient to break said emulsion and to precipitate the polycarbonate and separating the precipitated polycarbonate from the liquid in contact therewith.

6. The process according to claim 5 wherein the bisphenol is 2,2-bis(4-hydroxyphenyl)propane.

7. The process according to claim 5 wherein the drying oil is dehydrated castor oil.

References Cited by the Examiner

UNITED STATES PATENTS

| | | | |
|---|---|---|---|
| 2,970,131 | 1/1961 | Moyer et al. | 260—47 X |
| 3,030,335 | 4/1962 | Goldberg | 260—47 X |
| 3,036,037 | 5/1962 | Howe | 260—47 X |
| 3,043,800 | 7/1962 | Schnell et al. | 260—47 X |
| 3,065,204 | 11/1962 | Dietrich et al. | 260—47 X |
| 3,069,204 | 11/1962 | Stevens | 260—47 X |
| 3,157,606 | 11/1964 | Deanin et al. | 260—47 X |

FOREIGN PATENTS

| | | |
|---|---|---|
| 971,790 | 3/1959 | Germany. |
| 849,081 | 9/1960 | Great Britain. |

MURRAY TILLMAN, *Primary Examiner.*

HAROLD BURSTEIN, *Examiner.*